United States Patent [19]
Fitzgibbon

[11] Patent Number: 5,831,548
[45] Date of Patent: Nov. 3, 1998

[54] RADIO FREQUENCY TRANSMITTER HAVING SWITCHED MODE POWER SUPPLY

[75] Inventor: James J. Fitzgibbon, Streamwood, Ill.

[73] Assignee: The Chamberlain Group, Inc., Elmhurst, Ill.

[21] Appl. No.: 953,696

[22] Filed: Oct. 17, 1997

Related U.S. Application Data

[63] Continuation of Ser. No. 463,590, Jun. 5, 1995, abandoned.
[51] Int. Cl.$^6$ .................................................... H04Q 7/00
[52] U.S. Cl. .................................... 340/825.69; 341/176
[58] Field of Search ................... 340/825.69, 825.72, 340/825.56, 825.57, 333; 341/176; 455/127

[56] References Cited

U.S. PATENT DOCUMENTS

| | | | |
|---|---|---|---|
| 4,814,770 | 3/1989 | Reger | 455/127 X |
| 4,890,108 | 12/1989 | Drori et al. | 341/176 |
| 4,904,993 | 2/1990 | Sato | 340/825.57 |
| 5,383,044 | 1/1995 | Borchardt et al. | 340/825.72 X |
| 5,420,536 | 5/1995 | Faulkner et al. | 455/127 X |
| 5,519,711 | 5/1996 | Sointula | 455/127 X |

*Primary Examiner*—Edwin C. Holloway, III
*Attorney, Agent, or Firm*—Fitch, Even, Tabin, & Flannery

[57] ABSTRACT

A hand-held radio frequency transmitter for use in generating a coded radio frequency transmission has a switched mode power supply energizable by a battery. A radio frequency oscillator is driven by the switched mode supply. A modulator controls operation of the oscillator which produces a coded radio frequency signal.

8 Claims, 2 Drawing Sheets

RADIO FREQUENCY TRANSMITTER HAVING SWITCHED MODE POWER SUPPLY

This application is a continuation of application Ser. No. 463,590 filed Jun. 5, 1995, now abandoned.

BACKGROUND OF THE INVENTION

The invention relates in general to radio frequency transmitters and, in particular, to a switched mode power supply for a radio frequency transmitter.

Garage door operators commonly may be controlled from wired switches as well as radio frequency transmitting switches such as hand-held radio transmitters. Hand-held radio transmitters are energized by a battery and it is desirable to maintain as long a battery life as possible. However, it is also important for hand-held radio transmitters to be inexpensive, while still conforming with requirements of the Federal Communications Commission for center frequencies, bandwidth limitations, power limitations and the like. In the past hand-held radio transmitters, particularly of the type disclosed in U.S. Pat. No. 4,806,930 to Wojciak, Jr., were directed to battery operated systems wherein a radio transmitter might include a code generator as well as an oscillator having an output modulated in some fashion by a code generator for producing a modulated radio frequency output. The transmitter was energized by a battery E.

Such a transmitter, however, was relatively bulky, in part because relatively large batteries, such as 9-volt and 12-volt batteries, were used to energize the transmitters. Today, however, people have come to enjoy keyfob-type transmitters which have very small volumes and, accordingly, in many cases are now using 3-volt lithium batteries. Unfortunately, 3-volt lithium batteries do suffer from voltage drop off with battery life and the initial voltage of the batteries as received from the supplier varies to some extent. As a result, the transmitter radio frequency generating section will not always receive the same energizing voltage and this may lead to the transmitter drifting in frequency and possibly having its electrical characteristics affected greatly by the change in the battery voltage that it will be unable to oscillate at all and, hence, will be unable to generate a radio frequency signal.

What is needed, then, is a hand-held radio frequency transmitter including a voltage stabilized power supply which is compact and has a relatively small number of components.

SUMMARY OF THE INVENTION

A hand-held radio frequency transmitter includes a switched mode power supply for delivering a pre-selected potential to a radio-frequency oscillator. The switched mode supply is controlled by a microprocessor or other digital logic device, such as an application-specific integrated circuit or a custom integrated circuit and includes a switch controlled by the microprocessor, which switch enables or disables current from flowing through an inductor coupled to a storage capacitor. A feedback loop is coupled to the storage capacitor for signalling the microcontroller when the storage capacitor has reached a preselected voltage. A radio frequency oscillator is connected to be energized from the storage capacitor and includes an input for receiving a modulating code. The modulating code causes the oscillator to be switched on and off, thereby producing a pulsed carrier wave which may be supplied to a garage door operator or other device to be operated.

It is a principal aspect of the present invention to provide a hand-held radio frequency transmitter including a switched mode power supply driven from a battery for supplying uniform potential electrical energy to a radio frequency oscillator.

Other advantages of the present invention will become apparent to one of ordinary skill in the art, upon a perusal of the following specification and claims in light of the accompanying drawings.

DETAILED DESCRIPTION OF THE PREFERRED EMBODIMENT

Figure 1:
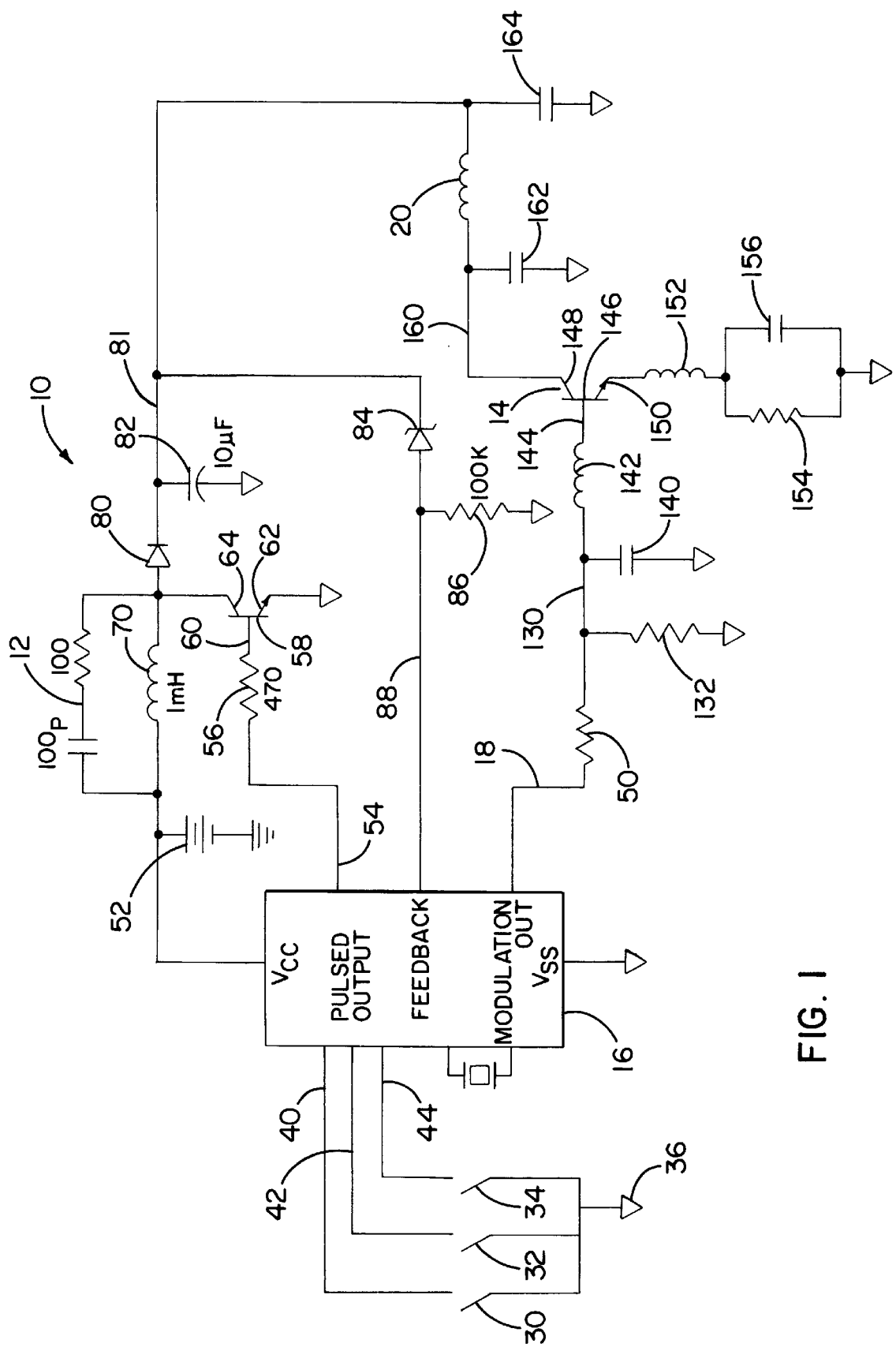
FIG. 1 is a schematic diagram of a hand-held radio frequency transmitter embodying the present invention.

Referring now the drawings and especially to FIG. 1, a hand-held radio frequency transmitter embodying the present invention is generally shown therein and is identified by numeral 10. The transmitter 10 includes a switched mode power supply 12 coupled to a radio frequency oscillator 14. A microcontroller 16 produces a modulating code on an output line 18 which is supplied to the oscillator 14 for causing the oscillator 14 to generate radio frequency energy which is emitted by an antenna 20 and which may be received by a garage door operator or other device to be operated.

A plurality of switches, respectively numbered 30, 32 and 34, are connected in parallel to a ground 36 and to three inputs 40, 42 and 44 of the microcontroller 16. Closure of switches 30, 32 or 34 each will respectively cause a different modulation code stream to be produced by the microcontroller 16 on the line 18. For instance, each of the switches may be dedicated to a particular garage door so that three garage doors could be operated separately from the three switches. In the alternative, one of the switches might be dedicated to sending the code, which would cause a light to be illuminated within the garage even when a garage door is not being operated. In response to closure of one of the three switches 30, 32 and 34, the modulation output is supplied on line 18 to a resistor 50 which ultimately feeds to the oscillator 14. The oscillator 14, however, must be energized in order to provide an output. It should be appreciated that a battery 52 is coupled to VCC pin of the microcontroller 16 to energize it at all times. The microcontroller 16 may, for instance, be a CMOS 8-bit microcontroller such as a Zilog Z86C03. One of the pins of the microcontroller 16 provides a pulsed output at pin 54 which is fed through a 470-ohm resistor 56 to an NPN transistor 58 which receives the pulses at its base 60, transistor emitter 62 is connected to ground. Current from the battery 52 may be supplied to a one millihenry inductor 70 coupled to the battery 52 and to the collector 64. A pulse on the line 54 switches the transistor 58 off uncoupling the inductor 70 from ground and causing current to flow through a diode 80 to a 10 microfarad electrolytic capacitor 82 and charging the 10 microfarad electrolytic capacitor 82 until the point that it reaches a voltage which is equal to the breakdown voltage of a Zener diode 84 connected to the capacitor 82. A 100 kilohm resistor 86 is connected between the Zener diode 84 and ground and a feedback line 88 couples the junction of the Zener diode 84 and resistor 86 to a feedback input terminal on the microcontroller. Thus, when the Zener diode goes into avalanche, driving the line 88 high, the microcontroller drives the pulsed output 54 high, biasing the transistor 58 on and interrupting current flow to the capacitor 82. The capacitor 82, however, has received sufficient potential to energize the oscillator 14 as will be seen hereinafter.

Figure 2:
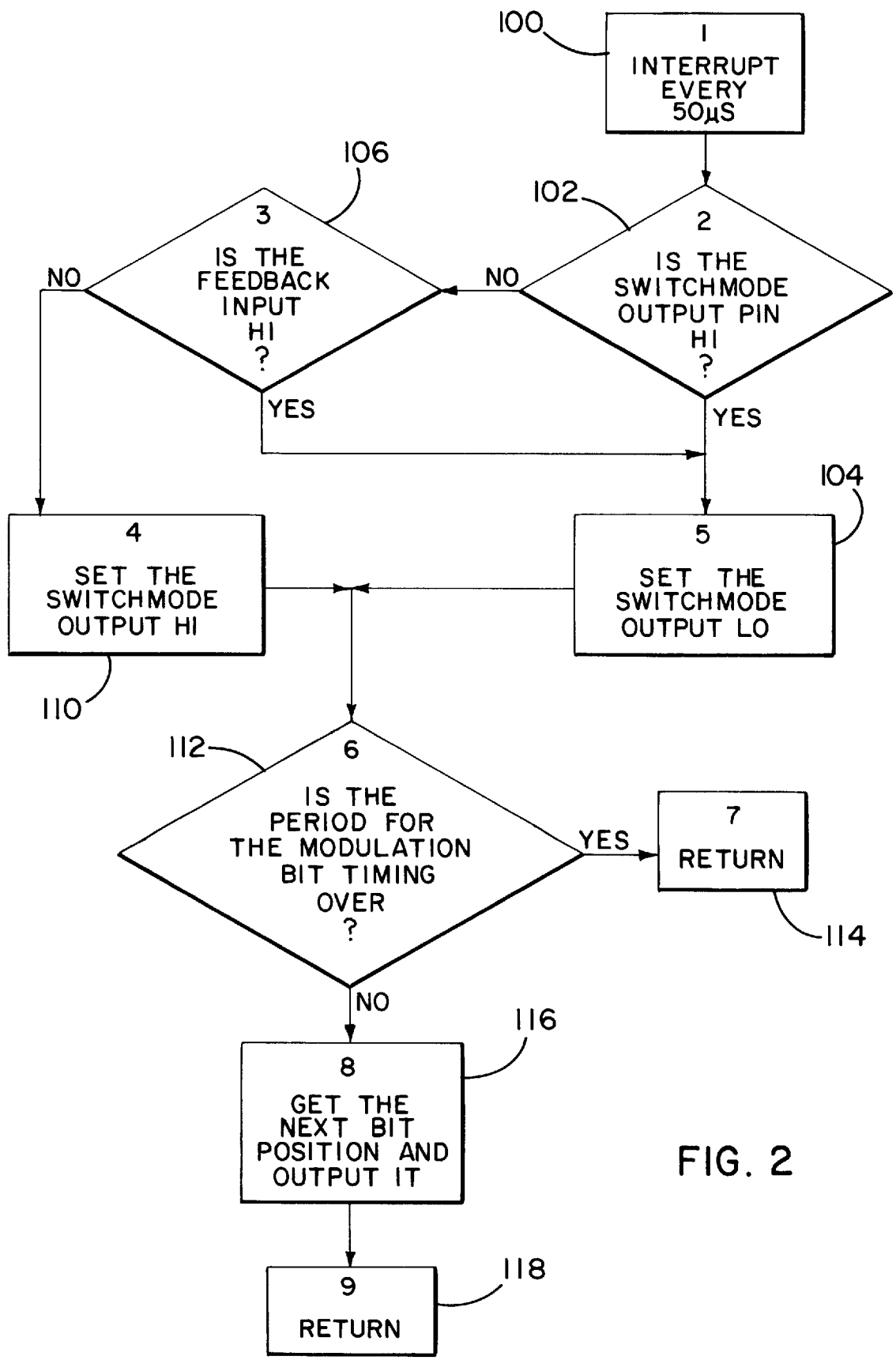
FIG. 2 is a flow chart showing operation of a microcontroller of the radio frequency transmitter shown in FIG. 1.

Referring now to FIG. 2, operation of the microcontroller 16 is shown therein. In a step 100 an interrupt occurs every 50 milliseconds. In a step 102, a test is made to determine whether the pulsed output pin connected to the line 54 is high. If it is high, the switched mode output on the line 54 is set low in a step 104. If the test of step 102 is negative, a test is made in a step 106 to determine whether the feedback input on line 88 is high. If it is, control is transferred to the step 104, causing the pin connected to line 54 to switch low. If it is not, control is transferred to a step 110, causing the switched mode output line connected to line 54 to switch high, turning on transistor 58. In a step 112, a test is made to determine whether the period for the modulation bit timing for the modulation generated on line 18 has expired. If the period for modulation bit timing has expired, the routine is exited in a step 114. If it has not expired, the next bit position is obtained in a step 116 and it is outputted, following which the routine is exited in a step 118.

The modulation bits supplied to resistor 50 are fed to a line 130 after having been reduced in potential by the voltage divider, including resistor 50 and a resistor 132, connected thereto. A capacitor 140, connected to ground, comprises a stabilizing filter capacitor and is connected to a series inductor 142 which blocks radiation of stray harmonics of the radio frequency in the range of 300 to 400 MHz. The modulated signal is then fed to a base 144 of an NPN transistor 146, also having a collector 148 and an emitter 150. The emitter 150 is connected through an inductor 152 for harmonics suppression and through a parallel resistor 154 and capacitor 156, which are connected to ground. The resistor 154 supplies control over the DC bias and the capacitor 156 controls the radio frequency gain of the oscillator of transistor 146. The emitter 148 of the transistor is connected via a line 160 to a grounded capacitor 162, having an antenna coil connected thereto. A second grounded capacitor 164 is connected to the line 81 as well as to the antenna coil 20. The coded transmission is transmitted by the antenna 20 to a garage door operator or other device to be operated as appropriate.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

```
;
;----------------------------------------------------------
;       EQUATE STATEMENTS
;----------------------------------------------------------
P01M_INIT            .EQU    00000100B     ; set mode p00-p03 out
P2M_INIT             .EQU    00000001B
P3M_INIT             .EQU    00000001B     ; set port3 p3-p33 input
P01S_INIT            .EQU    60000001B
P2S_INIT             .EQU    00000000B
P3S_INIT             .EQU    00000000B
;----------------------------------------------------------
;       INTERRUPTS
;----------------------------------------------------------
ALL_ON_IMR    .equ   00010000b             ; turn on int for radio
RETURN_IMR    .equ   00010000b             ; return on the IMR
;----------------------------------------------------------
;       GLOBAL REGISTERS
;----------------------------------------------------------
;****************************************************
; Code output functions
;****************************************************
CODE_GRP             .equ   10H            ;
CODEPOS       .equ   CODE_GRP+0            ; code presently being outputed
C11           .equ   CODE_GRP+1            ; code first bit
C12           .equ   CODE_GRP+2            ; code second bit
C13           .equ   CODE_GRP+3            ; code third bit
C14           .equ   CODE_GRP+4            ; code fourth bit
C15           .equ   CODE_GRP+5            ; code fifth bit
C16           .equ   CODE_GRP+6            ; code sixed bit
C17           .equ   CODE_GRP+7            ; code seventh bit
C18           .equ   CODE_GRP+8            ; code eight bit
C19           .equ   CODE_GRP+9            ; code nineth bit
C110          .equ   CODE_GRP+10           ; code tenth bit
TEMP          .equ   CODE_GRP+14           ; temp number for finding address
BITTEMP       .equ   CODE_GRP+15           ; the bit value temp
codepos       .equ   r0                    ;
c11           .equ   r1                    ;
c12           .equ   r2                    ;
c13           .equ   r3                    ;
c14           .equ   r4                    ;
c15           .equ   r5                    ;
c16           .equ   r6                    ;
c17           .equ   r7                    ;
```

-continued

```
c18             .equ    r8              ;
c19             .equ    r9              ;
c110            .equ    r10             ;
temp            .equ    r14             ;
bittemp         .equ    r15             ;
;*****************************************************
; Code output functions
;*****************************************************
CODE2_GRP       .equ    20H             ;
C21             .equ    CODE2_GRP+1     ; code first bit
C22             .equ    CODE2_GRP+2     ; code second bit
C23             .equ    CODE2_GRP+3     ; code third bit
C24             .equ    CODE2_GRP+4     ; code fourth bit
C25             .equ    CODE2_GRP+5     ; code fifth bit
C26             .equ    CODE2_GRP+6     ; code sixed bit
C27             .equ    CODE2_GRP+7     ; code seventh bit
C28             .equ    CODE2_GRP+8     ; code eight bit
C29             .equ    CODE2_GRP+9     ; code nineth bit
C210            .equ    CODE2_GRP+10    ; code tenth bit
c21             .equ    r1              ;
c22             .equ    r2              ;
c23             .equ    r3              ;
c24             .equ    r4              ;
c25             .equ    r5              ;
c26             .equ    r6              ;
c27             .equ    r7              ;
c28             .equ    r8              ;
c29             .equ    r9              ;
c210            .equ    r10             ;
CHECK_GRP               .equ    30H
CODECNT                 .equ    CHECK_GRP       ;/ DOWN FOR 1 mS
STACKTOP        .equ    127D            ; start of the stack
STACKEND        .equ    060H            ; end of the stack
WDT             .macro
                .byte 5th
                .endm
WDH             .macro
                .byte 4th
                endm
FILL            .macro
                .byte 0FFH
                .endm
TFILL           .macro
                FILL
                FILL
                FILL
                FILL
                FILL
                FILL
                FILL
                FILL
                FILL
                FILL
                .endm
HFILL           .macro
                TFILL
                TFILL
                TFILL
                TFILL
                TFILL
                TFILL
                TFILL
                TFILL
                TFILL
                TFILL
                .endm
;*****************************************************
;*
;*      Interrupt Vector Table
;*
;*****************************************************
                .org    0000H
                .word   000CH           ;IRQ0 P3.2 n
                .word   000CH           ;IRQ1, P3.3
                .word   000CH           ;1RQ2, P3.1
                .word   000CH           ;IRQ3, P3.2 p
                .word   TIMERUD         ;IRQ4, T0
                .word   000CH           ;IRQ5, T1
                .org    000CH
;*****************************************************
```

-continued

```
; WATCHDOG INITILIZATION
;********************************************************
start:
START:              di                      ; turn off the interrupt for init
                    WDH
                    WDT                     ; kick the dog
;********************************************************
; STACK INITILIZATION
;********************************************************
SETSTACK:
                    clr     254
                    ld      255,#STACKTOP   ; set the start of the stack
;********************************************************
; DATA INITILIZATION
;********************************************************
BIT1TO10
                    ld      C11,#03         ; code 33333333333 MAX POWER
                    ld      C12,#03
                    ld      C13,#03
                    ld      C14,#03
                    ld      C15,#03
                    ld      C16,#03
                    ld      C17,#03
                    ld      C18,#03
                    ld      C19,#03
                    ld      C110,#03
BIT11TO20
                    ld      C21,#03         ;code 33333333333 MAX POWER
                    ld      C22,#03
                    ld      C23,#03
                    ld      C24,#03
                    ld      C25,#03
                    ld      C26,#03
                    ld      C27,#03
                    ld      C28,#03
                    ld      C29,#03
                    ld      C210,#03
                    clr     CODEPOS
;********************************************************
; TIMER INITILIZATION
;********************************************************
                    ld      PRE0,#00000101B ; set the prescaler to/1 for 4Mhz xtal
                    ld      PRE1,#01000010B ; one shot mode/16
                    ld      T0,#032H        ; set the counter to count 32 through 0
                    ld      TMR,#00000011B  ; turn on the timer
;********************************************************
; PORT INITILIZATION
;********************************************************
                    ld      P0,#P01S_INIT   ; RESET all ports
                    ld      P2,#P2S_INIT    ;
                    ld      P3,#P3S_INIT    ;
                    ld      P01M,#P01M_INIT ; set mode
                    ld      P3M,#P3M_INIT   ; set porta p30-p33 input analog mode
                    ld      P2M,#P2M_INIT   ; set port 2 mode
;********************************************************
; INTERRUPT INITILIZATION
;********************************************************
SETINTERRUPTS:
                    ld      IPR,#00000001B  ; set the priority to timer
                    ld      IMR,#ALL_ON_IMR ; turn on the interrupt
;********************************************************
; MAIN LOOP
;********************************************************
MAINLOOP:
                    ei                      ; enable interrupt
                    ld      P01M,#P01M_INIT ; set mode
                    ld      P3M,#P3M_INIT   ; set port3
                    ld      P2M,#P2M_INIT   ; set port2
                    jr      MAINLOOP        ;
;********************************************************
; TIMER UPDATE FROM INTERUPT EVERY 50uS
;********************************************************
TIMERUD:
                    WDT                     ; kick the dog
                    tm      P2,#00000001b   ; test for the voltage max meet
                    jr      z,clearexit     ;
                    xor     P2,#00000010b   ; toggle the output pin
                    jr      CODE
clearexit:
                    and     P2,#21111101b   ; turn off the output
```

-continued

```
CODE:
            dec     CODECNT             ; decrease the code counter
            jr      nz,NOCODEOUT
            ld      CODECNT,#20d        ; set the count for 1mS period
            ei                          ; allow stacking of interrupts
            call    CODEOUT             ; output the code
NOCODEOUT:
            iret
;*******************************************************
; CODE OUTPUT ROUTINE EVERY 1mS
;*******************************************************
CODEOUT:
BILLOUT:
            inc     CODEPOS             ; set the position to the next one
            cp      CODEPOS,#160d       ; test for the last count position
            jr      ult,ACODEOP         ; if not the Last count then continue
            clr     CODEPOS             ; else reset the counter
ACODEOP:
            cp      CODEPOS,#128D       ; test for the blank time
            jr      ult,ABL2            ; if not the do the code
            jp      OFFEXIT             ; turn off the output
ABL2:
            cp      CODEPOS,#83D        ; test for second frame active time
            jr      ugt,AF2             ; if the second frame then jump
            cp      CODEPOS,#44d        ; test for the first blank time
            jr      ult,ABL3            ; if not the first blank time then output
bits
            jp      OFFEXIT             ; blank tiem turn off the outputs
ABL3:
            cp      CODEPOS,#03         ; test for the sync
            jr      ugt,ABITS           ; if not do the bits
            jp      z,ONEXIT            ; if sync time set the output
            jp      OFFEXIT             ; else turn off the output
ABITS:
            ld      TEMP,CODEPOS        ; get the present counter
            rcf                         ; clear the carry flag
            rrc     TEMP                ; /2
            rcf                         ; clear the carry flag
            rrc     TEMP                ; /4
            add     TEMP,#CODE_GRP      ; add in the off set
            ld      BIUEMP,@TEMP        ; read the bit to output
            ld      TEMP,CODEPOS        ; get the position in the bit
            and     TEMP,#00000011B     ;
            add     TEMP,BITTEMP        ; see if the output needs to be set
            cp      TEMP,#04            ;
            jr      ult,OFFEXIT
            jp      ONEXIT
AF2:
            ld      TEMP,CODEPOS        ; remove the off set
            sub     TEMP,#84D           ;
            cp      TEMP,#03            ; test for the sync
            jr      ugt,ABITS2          ; if not do the bits
            cp      TEMP,#00            ;
            jp      ugt,ONEXIT          ; if sync time set the output
            jp      OFFEXIT             ; else turn off the output
ABITS2:
            rcf                         ; clear the carry flag
            rrc     TEMP                ; /2
            rcf                         ; clear the carry flag
            rrc     TEMP                ; /4
            add     TEMP,#CODE2_GRP     ; add in the off set
            ld      BITTEMP,@TEMP       ; read the bit to output
            ld      TEMP,CODEPOS        ; get the position in the bit
            and     TEMP,#00000011B     ;
            add     TEMP,BITTEMP        ; see if the output needs to be set
            cp      TEMP,#04            ;
            jr      ult,OFFEXIT
            jp      ONEXIT
ONEXIT:
            ld      P0,#00000001b       ; turn on the output
            jr      CODEDONE            ;
OFFEXIT:
            ld      P0,#00000010B       ; turn off the output
CODEDONE:
            ret
.end
```

What is claimed is:

1. A hand-held radio frequency transmitter for use in generating a coded radio frequency transmission comprising:
   a switched mode power supply energizable by a battery for delivering a pre-selected, uniform potential greater than the potential of the battery to an oscillator;
   an oscillator coupled to be driven by the switched mode power supply; and
   a modulator for controlling operation of the oscillator to cause the oscillator to be modulated by coded signals and for controlling operation of the switched mode power supply for enabling and disabling current flowing therethrough;
   wherein said switched mode power supply is coupled in a feedback loop with said modulator wherein the feedback loop signals said modulator when the switched mode power supply reaches the pre-selected, uniform potential effective for minimizing transmitter frequency drift.

2. A transmitter as recited in claim 1, wherein said modulator comprises a plurality of switches and a programmable microcontroller having at least one input port and at least one output port for controlling operation of the oscillator to cause the oscillator to be modulated by the coded signals responsive to said plurality of switches.

3. A transmitter as recited in claim 1 comprising a battery for powering said switched mode power supply and said modulator.

4. A hand-held radio frequency transmitter, comprising:
   a switched mode power supply, energizable by a battery, for delivering a pre-selected, uniform voltage treater than the potential of the battery to an oscillator, said power supply including a storage capacitor;
   a controller comprising at least one input port and at least one output port coupled in a feedback loop with said switched mode power supply, for controlling said switched mode power supply via said at least one output port, the feedback loop signaling said controller at said at least one input port when the storage capacitor reaches said preselected, uniform voltage, effective for minimizing transmitter frequency drift; and
   an oscillator powered by said switched mode power supply for use in generating a coded radio frequency transmission responsive to said controller;
   said controller being further responsive to an event for controlling said oscillator for generating the coded radio frequency transmission.

5. A transmitter as recited in claim 4, wherein said controller comprises a programmable microcontroller.

6. A transmitter as recited in claim 4, comprising a battery for powering said switched mode power supply and said controller.

7. A transmitter as recited in claim 4, comprising a plurality of switches coupled to said controller for controlling said oscillator for generating the coded radio frequency transmission.

8. A transmitter as recited in claim 7, wherein said event comprises an operation of one or more of said switches.

* * * * *